July 4, 1967 J. LINDT 3,329,902

AUTOMATIC GAIN CONTROL WITH DELAYED DECAY

Filed Jan. 29, 1964 2 Sheets-Sheet 1

United States Patent Office 3,329,902

Patented July 4, 1967

3,329,902

AUTOMATIC GAIN CONTROL WITH DELAYED DECAY

Jan Lindt, Rotterdam, Netherlands, assignor to Van der Heem N.V., The Hague, Netherlands, a Dutch limited-liability company Filed Jan. 29, 1964, Ser. No. 340,910
Claims priority, application Netherlands, Feb. 15, 1963, 289,095
5 Claims. (Cl. 325—410)

ABSTRACT OF THE DISCLOSURE

A device for automatic gain control comprising a detector having an input for a received signal and having an output which supplies a control signal, a memory circuit connected to the output of the detector, which stores the control signal and has an output which supplies a gain control signal proportional to the stored signal, a differentiator connected to the output of the detector, having an output which supplies a pulse in response to a sudden decrease in the strength of the control signal, a monostable multivibrator connected to the output of the differentiator to receive a pulse for changing the multivibrator to its metastable condition, and a circuit which connects the multivibrator to the memory circuit and which is actuated, upon the return of the multivibrator to its stable condition, to reset the memory circuit to the existing value of the control signal.

*Background of the invention*

The invention relates to an automatic gain control with delayed decay.

Such a gain control is especially useful for reception of C.W. and single sideband transmissions, in which case no signal at all is received during the spaces between the code marks and during the speech pauses, whereby in the asbence of special measures the gain would be increased materially during these pauses, which has the disadvantage that in these pauses a strong noise would become audible, whilst the initial part of the following code mark or speech signal would be reproduced with an excessive strength, due to the unavoidable lag of the control, which results in a very objectionable crash at the onset of each code mark or speech portion, as well as a distortion of the leading edge.

These difficulties do not arise with manual gain control, but this has the disadvantage that the adjustment must continuously be adapted to the prevailing reception conditions and that such a manual gain control must be continuously readjusted in the presence of fluctuations of the reception strength by fading phenomena and the like.

*Summary of the invention*

The invention aims at providing a device which combines the advantages of automatic control with the advantages of manual control, but which is substantially free from the disadvantages of either system.

For that purpose, a device according to the application is characterised in that the control signal is obtained from a memory circuit to which the output signal of the detector is supplied, which memory circuit is through a gate connected to the output of a reference circuit which generates a signal with a strength which fluctuates in a similar way as the strength of the received signal, whilst a first differentiator is connected to the output of the detector, which differentiator supplies pulses only in response to sudden decreases of the strength of the received signal, which pulses are supplied to a monostable multivibrator, which is thereby brought in the metastable condition and which when reverting to the stable condition temporarily opens the gate, whereby the output signal of the memory circuit is reduced to the output signal of the reference circuit.

*Brief description of the drawing*

The invention will be elucidated below with reference to the accompanying drawing, which shows an embodiment of a device according to the invention.

*Description of the preferred embodiments*

The received signal is supplied to the detector 1 (for example in the form of an intermediate frequency signal).

Figure 1:
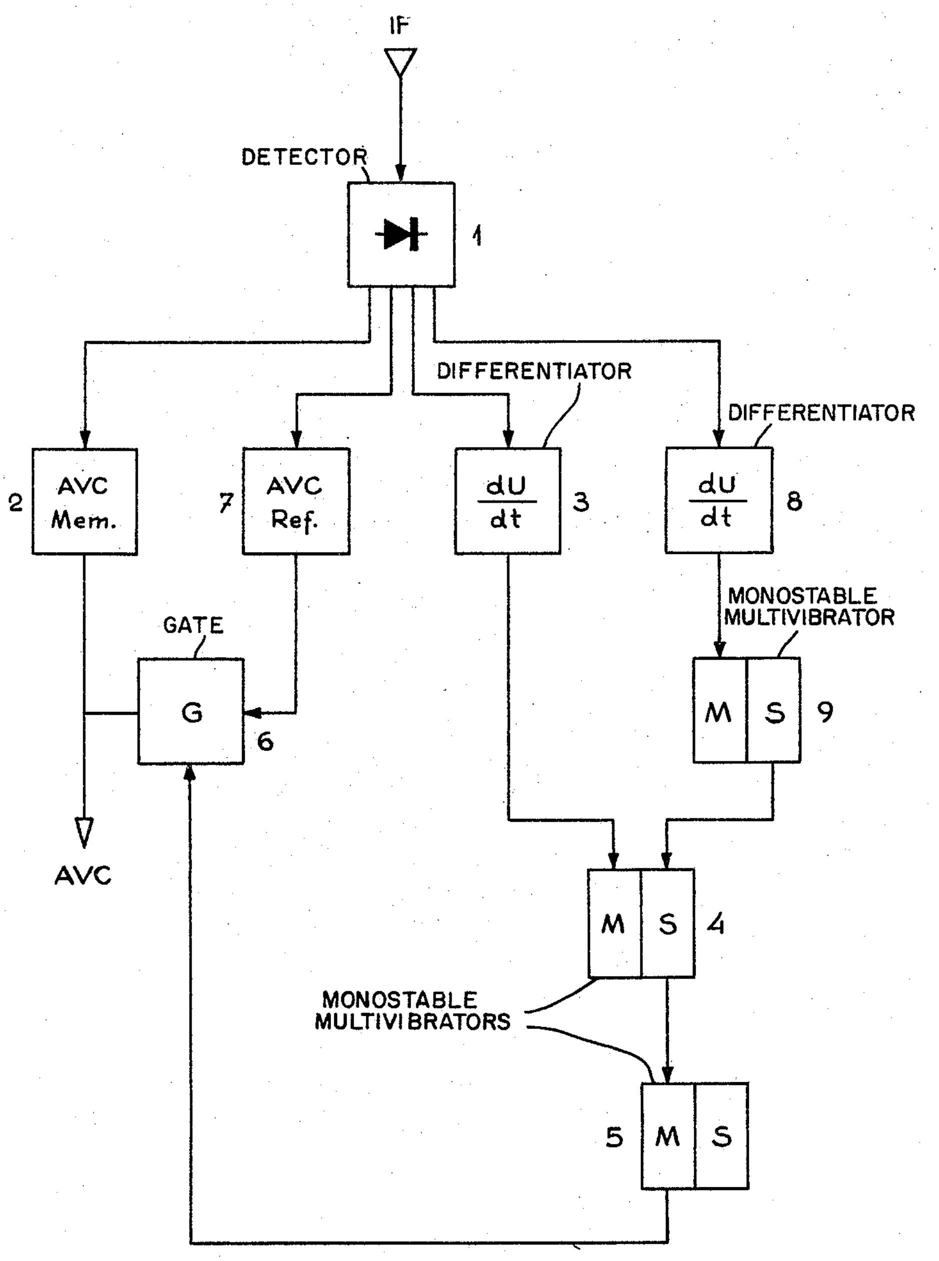
FIGURE 1 is a block circuit diagram of a device according to the invention.
Figure 2:
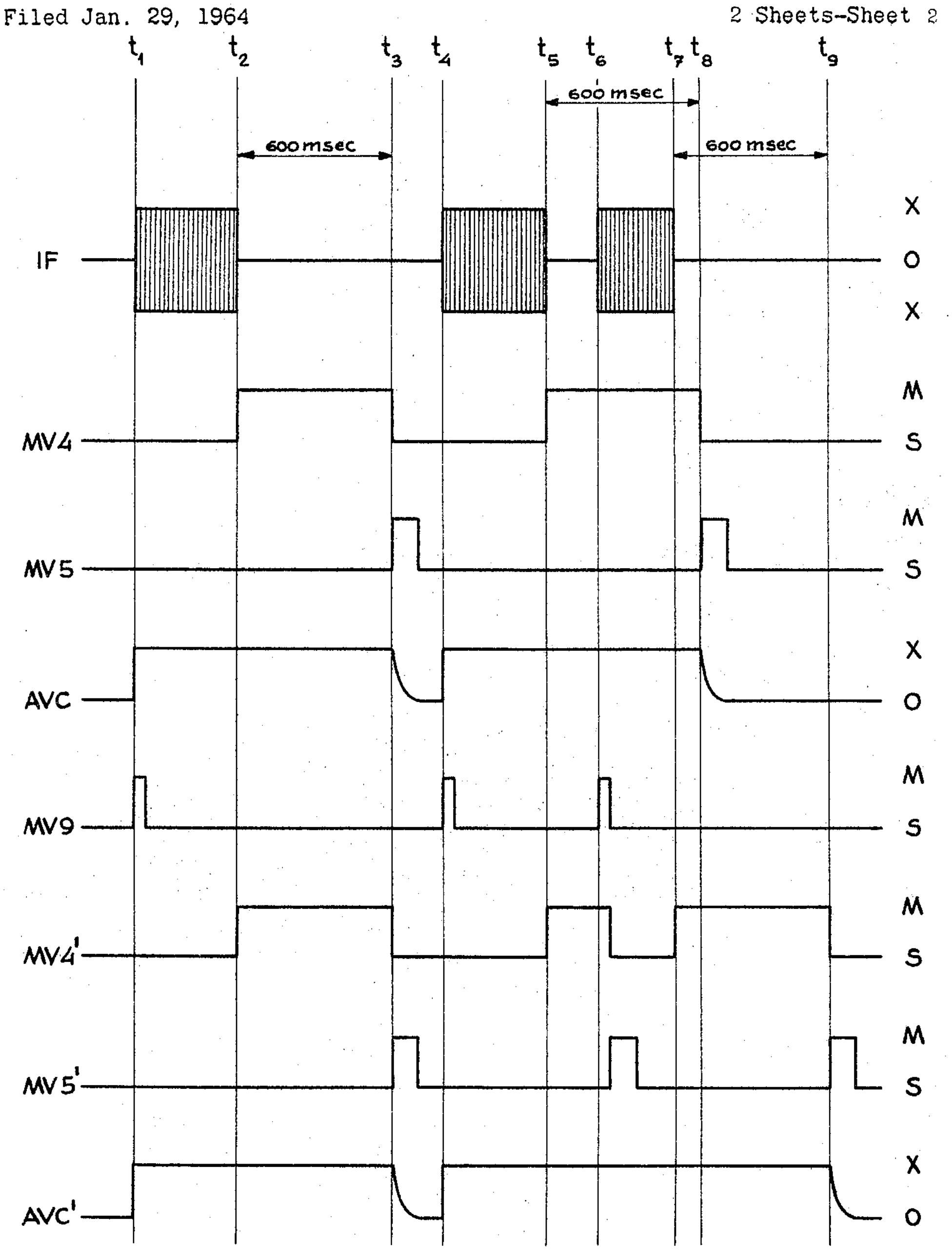
FIGURE 2 is a diagram for explaining the operation of a device according to FIGURE 1.

In FIGURE 2 this signal has been depicted diagrammatically at IF and it consists of parts with an amplitude X (the variations of which have not been taken into account for the sake of convenience) and intermediate signal pauses with an amplitude O.

At the time $t_1$ the first signal portion begins, which extends to the time $t_2$. During this interval the detector 1 generates a control signal X (shown at AVC in FIGURE 2), which is stored in a memory circuit 2 (for example a capacitor in a circuit with a small charging time constant and a large discharging time constant). The signal which is present in this memory influences the gain of the stages to be controlled.

At the time $t_2$ the signal amplitude decreases to zero, whereby the differentiator 3 supplies a pulse which brings the monostable multivibrator 4, which up to this instant was in the stable condition S, in the metastable condition M, as shown at MV4 in FIGURE 2. The metastable condition M extends over for example 600 milliseconds and ends at the time $t_3$. Until this time, the control signal is maintained substantially unmodified at the value X due to the large discharging time constant of the memory, circuit 2. When reverting to the stable condition S, the multivibrator 4 triggers the multivibrator 5, which so far was in the stable condition S, as shown at MV5 in FIGURE 2, and now is brought into the metastable condition M. During the metastable condition M of the multivibrator 5, the gate 6 is in the open condition, whereby the memory circuit 2 is discharged to the value of the reference signal which is present in the circuit 7 and which corresponds with the instantaneous strength of the signal IF. As it has been assumed that at the time $t_3$ still no new signal portion has begun, the value of the control signal in the memory circuit 2 will decay fairly rapidly to zero. If, however, at the time $t_3$ a signal part with an amplitude X would again be present, the control signal AVC is maintained at the value X, so that the "holding time" of the control signal AVC amounts to 600 milliseconds and signal interruptions of less than 600 milliseconds do not influence the control signal.

The multivibrator 5 serves for defining the interval during which the gate 6 is opened.

The system as described so far bridges signal pauses of less than 600 milliseconds in a satisfactory way. Nevertheless, a further extension is desirable for the reasons to be described below.

If at the time $t_4$ a new signal part occurs, which lasts until the time $t_5$ (vide IF in FIGURE 2), a control signal X is generated between the times $t_4$ and $t_5$ (vide AVC in FIGURE 2), which would last until the time $t_8$, at which instant the multivibrator 4 would revert to its stable condition S (vide MV4 in FIGURE 2), whereby the multivibrator 5 would be brought in its metastable condition M (vide MV5 in FIGURE 2) and the gate 6 would be opened. Since at the time $t_8$ no signal is present in the reference circuit 7, the control signal (AVC in FIGURE 2) would decay rapidly to zero.

However, it is very well possible that already at the time $t_6$ a further signal part (IF in FIGURE 2) has started, which lasts until the time $t_7$, which may be shortly before the time $t_8$. In that case the control signal (AVC in FIGURE 2) would drop out already a short time after the end of the last signal part (IF in FIGURE 2), so that a "holding time" of 600 milliseconds after the end of the last signal part is not always ensured.

This imperfection can be removed by incorporating a second differentiator 8 in the system, which at the occurrence of each sudden increase of the strength of the signal IF generates an output pulse, which brings a third monostable multivibrator 9 in its metastable condition M (vide MV9 in FIGURE 2). This condition lasts a very short time and when the multivibrator 9 reverts to its stable condition S (vide MV9 in FIGURE 2) the multivibrator 4 is reset to its stable condition S before the expiration of the maximum duration of its metastable condition M (vide MV4' in FIGURE 2). Thereby, the multivibrator 5 is brought in its metastable condition M already shortly after the time $t_6$ (vide MV5' in FIGURE 5) and the gate 6 is opened.

The small delay provided by the duration of the metastable condition M of the multivibrator 9 (vide MV9 in FIGURE 2) ensures that the gate 6 is opened very shortly after the time $t_6$, so that the reference circuit 7 with certainty supplies a signal when the gate 6 is opened and an interruption, however short, of the control signal (AVC' in FIGURE 2) is prevented. The control signal (AVC' in FIGURE 2) therefore lasts without interruption until the time $t_9$. At the time $t_7$ the multivibrator 4 is again brought in the metastable condition M (vide MV4' in FIGURE 2); which condition lasts for 600 milliseconds, i.e., up to the time $t_9$. At this time the multivibrator 4 reverts to its stable condition S (vide MV4' in FIGURE 2), so that the multivibrator 5 temporarily assumes the metastable condition M (vide MV5' in FIGURE 2) and the gate 6 is opened.

At the time $t_9$ the reference circuit 7 supplies no signal, so that the control signal (AVC' in FIGURE 2) rapidly decays to zero. By the presence of the differentiator 8 and the multivibrator 9 it has consequently been ensured that the "holding time" of 600 milliseconds starts at the end of the last signal part.

Obviously, the "holding time" can have a value differing from 600 milliseconds, depending upon the application under consideration. In some cases it is moreover possible to open the gate 6 directly by means of a pulse which is supplied by the multivibrator 4 when it reverts to its stable condition, whereby the multivibrator 5 can be dispensed with in that case.

For completeness' sake it is remarked that the multivibrator 9 is brought in the metastable condition M also at the times $t_1$ and $t_4$ and shortly thereafter reverts to its stable condition S. This, however, has no effect, since the multivibrator 4 at that time already is in the stable condition.

What I claim is:

1. A device for automatic gain control comprising a detector having an input for a received signal and having an output which supplies a control signal, wherein the improvement comprises a memory circuit connected to the output of the detector, which stores the control signal and has an output which supplies a gain control signal proportional to the stored signal, a differentiator connected to the output of the detector, having an output which supplies a pulse in response to a sudden decrease in the strength of the control signal, a monostable multivibrator connected to the output of the differentiator to receive a pulse for changing the multivibrator to its metastable condition, and a circuit which connects the multivibrator to the memory circuit and which is actuated, upon the return of the multivibrator to its stable condition, to reset the memory circuit to the existing value of the control signal.

2. A device according to claim 1 wherein the duration of the metastable state of the multivibrator is approximately 600 milliseconds.

3. A device according to claim 1 comprising a reference circuit connected to the output of the detector, which generates a reference signal proportional to the control signal, and a gate connected between the reference circuit and the memory circuit, which opens momentarily, upon the return of the multivibrator to its stable condition, to reset the value of the output of the memory circuit to the existing value of the reference signal.

4. A device according to claim 3 comprising a second monostable multivibrator, having a metastable state duration substantially shorter than that of the first multivibrator, which is connected to the first multivibrator to cause the second multivibrator to change to its metastable condition upon the return of the first multivibrator to its stable condition, and which maintains the gate open while the second multivibrator is in its metastable condition.

5. A device according to claim 1 comprising a second differentiator connected to the output of the detector, having an output which supplies a pulse in response to a sudden increase in the strength of the control signal, and an auxiliary monostable multivibrator, having a metastable state of very short duration, which is connected to the output of the second differentiator to receive a pulse for changing the auxiliary multivibrator to its metastable condition, and has an output connected to the first multivibrator which resets the first multivibrator to its stable condition when the auxiliary multivibrator returns to its stable condition.

References Cited

UNITED STATES PATENTS 3,230,458 1/1966 Strangeland ---------- 325—410

KATHLEEN H. CLAFFY, *Primary Examiner.*

R. LINN, *Assistant Examiner.*